United States Patent [19]

Lutat

[11] Patent Number: 5,390,639
[45] Date of Patent: Feb. 21, 1995

[54] INTERNAL COMBUSTION ENGINE

[75] Inventor: Martin Lutat, Sankt Augustin, Germany

[73] Assignee: Klockner-Humboldt-Deutz Aktiengesellschaft, Cologne, Germany

[21] Appl. No.: 76,474

[22] Filed: Jun. 14, 1993

Related U.S. Application Data

[63] Continuation-in-part of Ser. No. 904,982, Jun. 26, 1992, abandoned.

[30] Foreign Application Priority Data

Jun. 27, 1991 [DE] Germany .............................. 4121242

[51] Int. Cl.6 .......................................... F02M 51/00
[52] U.S. Cl. ................................................... 123/78
[58] Field of Search ................. 123/478, 414, 480, 486

[56] References Cited

U.S. PATENT DOCUMENTS

| | | | |
|---|---|---|---|
| 4,932,380 | 6/1990 | Kobayashi et al. | 123/478 |
| 4,957,089 | 9/1990 | Morikawa | 123/486 |
| 4,967,711 | 11/1990 | Morikawa | 123/478 |
| 5,117,795 | 6/1992 | Oshuga et al. | 123/478 |
| 5,156,125 | 10/1992 | Fukui et al. | 123/414 |
| 5,211,150 | 5/1993 | Anzai | 123/480 |

Primary Examiner—Raymond A. Nelli
Attorney, Agent, or Firm—Hardaway Law Firm; Charles L. Schwab

[57] ABSTRACT

A method of calculating fuel injection quantities, as determined by the initiation and duration of fuel injection, in an internal combustion engine in response to repetitive engine operating parameters measured during engine operation. The quantity of fuel injected into a cylinder of a multicylinder engine may be determined through measurement of an operating characteristic of that cylinder immediately prior to injection. The timing of injection may also be responsive to the measurement of the engine operating characteristic which may not be uniformly repetitive.

1 Claim, 3 Drawing Sheets

INTERNAL COMBUSTION ENGINE

This application is a continuation-in-part of application Ser. No. 07/904,982, filed Jun. 26, 1992, now abandoned.

TECHNICAL FIELD

This invention relates to a method for the determination of a quantity dependent on at least one repetitive process.

BACKGROUND OF THE INVENTION

In a device for the control of the quantity of fuel to be injected to an internal-combustion engine, it is known by virtue of German patent document DE-OS 34 26 799, that there is a need to take account of the operational behavior of the solenoid-actuated valve that controls the quantity of fuel to be injected. More pronounced fluctuations in parameters or nonuniformities in components of the injection system or of the internal-combustion engine itself are not taken into consideration. Thus parameters can change disadvantageously during the control process. What is more, the known device for the control of the quantity of fuel to be supplied to an internal-combustion engine is designed solely for the triggering of a single solenoid-actuated valve, whose operational behavior is taken into account. No information is provided on the control of the quantity of fuel to be supplied to an internal-combustion engine having more than one solenoid-actuated valve.

OBJECTS AND BRIEF SUMMARY OF THE INVENTION

It is an object of the invention to specify a method for the determination of a quantity dependent on at least one repetitive process, with which method the quantity can be accurately determined with allowance for changes in further measured parameters and with allowance for the operational behavior of an adjustment means and the cited disadvantages can be avoided.

For this purpose, the determination, which is in particular a calculation, is initiated by the repetitive process. By this means it is possible to determine the quantity accurately, with allowance for changes in measured parameters and for the operational behavior of the adjustment means, in particular when the process repeats itself temporally faster than the measured quantities and operational quantities change. In a particularly advantageous fashion, the quantity is therefore determined (calculated) in dependence on the measured parameters and/or on the operational behavior of the adjustment means. Likewise, there is the advantage that the quantity determined is temporally immediately available for the control of the adjustment means without the necessity of a control action being performed.

In development of the invention, the determination of the quantity takes place during a specifiable duration. This has the advantage that the determination (calculation) of the quantity is completed within the specifiable duration, so that a new determination can be performed afterward, in dependence on the repetitive process. This is advantageous, for example, if the determination of the quantity is performed inside a subprogram or in an interrupt routine. A dependence with the specifiable time interval is also conceivable, for example on the repetitive process.

In development of the invention, the repetitive process is a pulse train, which is initiated in particular by one of the measured parameters. If the repetitive process is a pulse train, said pulse train can advantageously be employed to initiate the determination of the quantity. This is advantageous when sensors measure a mechanical motion (for example a rotation) and transform said motion into a train of electrical pulses. The repetitive process may be, for example, the rotation speed of an internal-combustion engine, which is measured by a suitable rotation-speed pickup that initiates the pulse train or transforms the measured rotation speed into a train of electrical pulses.

In development of the invention, every pulse in the pulse train initiates the determination of the quantity. This has the advantage that all the information available from the repetitive process can be employed for determining the quantity. For this purpose, in a particular embodiment of the invention, every pulse in the pulse train and, in particular, its leading flank is employed to initiate the determination of the quantity.

In development of the invention, the quantity determined represents a time and/or a duration. Thus, with initiation by a pulse in the pulse train, with allowance for the measured parameters and for the operational behavior of the adjustment means, the time at which the adjustment means is actuated can be determined. Along with the determination of the time at which the adjustment means is to be actuated, the duration during which the adjustment means is activated or deactivated can also be determined. In the case of a fuel-injection device, the time can be, for example, the beginning of injection and the duration can be the duration of injection during which a quantity of fuel is injected into a combustion chamber of an internal-combustion engine. Here the repetitive process is a process representing combustion in the internal-combustion engine. It can be, for example, the position of the crankshaft relative to one cylinder of the internal-combustion engine, which position is measured by means of an appropriate sensor. In a particular embodiment of the invention, the determination of the quantity in the case of a multicylinder internal-combustion engine is performed for each individual cylinder. This has the advantage that, for example, differences between the individual cylinders due to age or wear are measured and are taken into account in the determination of the quantity. Moreover, it is also conceivable to measure the combustion state of the internal-combustion engine on the basis of the quantity determined and to detect an abnormal combustion state. This exists, for example, when the quantity determined (for example, the beginning of injection or the duration of injection) is greater than or less than the expected or specified limits.

In development of the invention, the beginning of injection to be set and the duration of injection for any one cylinder of the internal-combustion engine is calculated before the beginning of injection of this cylinder. This cylinder-synchronous and cylinder-individual calculation of the beginning of injection and the duration of injection has, again, the advantage that nonuniformities between the individual cylinders, which result from different design tolerances or from wear, are taken into account. By means of an appropriate correction of the beginning of injection or the duration of injection, these nonuniformities can be compensated. Moreover, the cylinder-individual calculation has the advantage that the operational quantities of the internal-combustion engine as well as further measurable parameters, such as for example a power demand, are measured currently and are taken into account in the calculation of the beginning of injection and the duration of injection, so that these are accurately determined. Moreover, it is possible to take account of quantities of the adjustment means (for example, the pickup times or drop times of a solenoid-actuated valve) themselves as well as to take account of the duration that is required for the calculation.

The invention is explained in more detail on the basis of the timeline diagrams drawn in the Figures and is described in more detail for the example of fuel injection in an internal-combustion engine.

DETAILED DESCRIPTION OF THE DRAWINGS

Figure 1A:
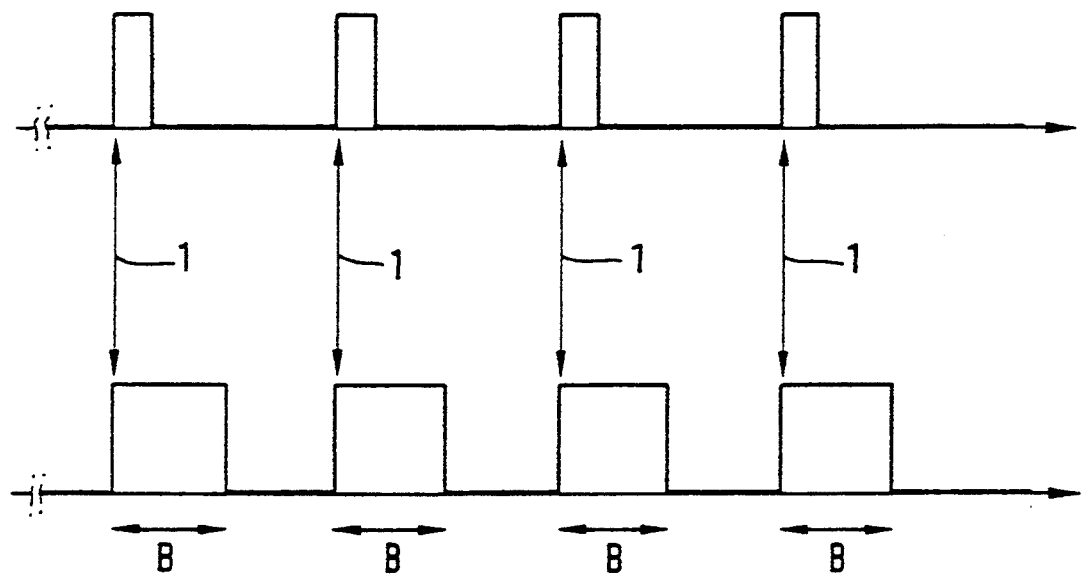
FIGS. 1A and 1B show a method in accordance with the invention for the case of a uniformly repetitive process.
Figure 1B:
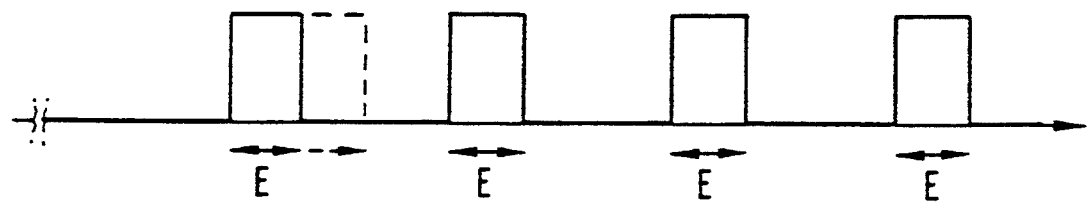

FIGS. 1A and 1B show a method in accordance with the invention for the case of a uniformly repetitive process. The uniformly repetitive process is represented in FIG. 1A by means of the pulse train shown at top, which are generated by means of appropriate sensors that are attached to the individual cylinders of the internal-combustion engine. These sensors measure, for example, the position of the engine crankshaft or the engine camshaft relative to the individual engine cylinders. The determination of the quantities, beginning of fuel injection and duration of injection, is initiated by each pulse generated. For this purpose, a calculation having duration B is started on the basis of each pulse in the pulse train shown at top (coincidence of the flanks identified by the arrows 1), which duration is in particular constant. During this calculation, which can advantageously take place in an interrupt routine, the current operating parameters of the internal-combustion engine, such as pressures, temperatures, rotation speed, voltage, as well as operating quantities of the adjustment means (e.g., pickup time of a solenoid-actuated valve) and further parameters, such as for example a power demand (gas pedal position) are measured. In dependence on the quantities measured, the beginning of injection and the duration of injection is calculated during the calculation duration B, said beginning of injection and duration of injection being indicated in FIG. 1B. The pulse train shown in FIG. 1B need not necessarily be uniform in the case of a uniformly repetitive process. Thus it is conceivable that, in dependence on the measured quantities, the duration of injection, designated as E, varies or the beginning of injection is not immediately subsequent to the completion of the calculation B.

Figure 2A:
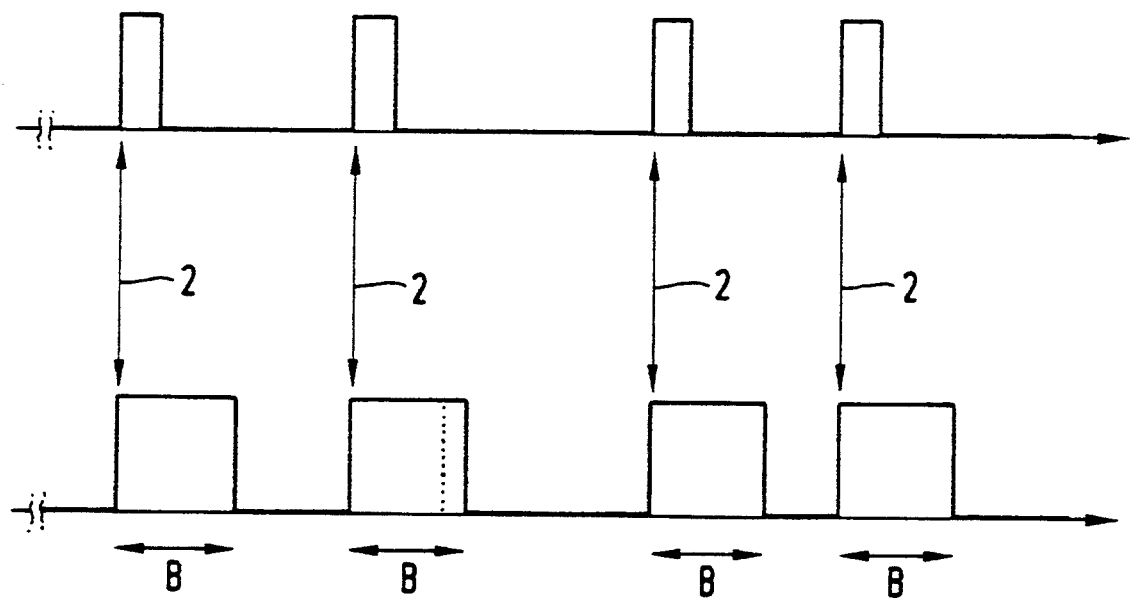
FIGS. 2A and 2B show a method in accordance with the invention for the case of a nonuniformly repetitive process.
Figure 2B:
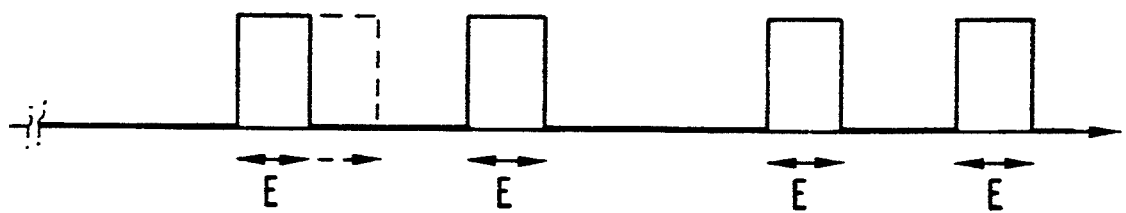

FIGS. 2A and 2B show the method in accordance with the invention for the case of a nonuniformly repetitive process. In FIG. 2A, the pulses of the individual cylinders occur at unequal intervals from one another. The calculation pulse train shown in the lower diagram of FIG. 2B is initiated by the pulses occurring at unequal intervals from one another, the initiated calculation duration B advantageously being constant; moreover, however, a variation in the calculation duration B is also conceivable. Again, the calculation duration B is advantageously started by the leading flank of the pulses shown in the top diagram, so that the leading flanks of the pulses shown at top, identified by the arrows 2, and the calculation duration B shown in the lower diagram of FIG. 2B coincide. During the calculation duration B, the calculation of beginning of injection and duration of injection, which are reproduced in the diagram of FIG. 2B, takes place in an analogous procedure to the procedure described in FIGS. 1A and 1B.

Figure 3:
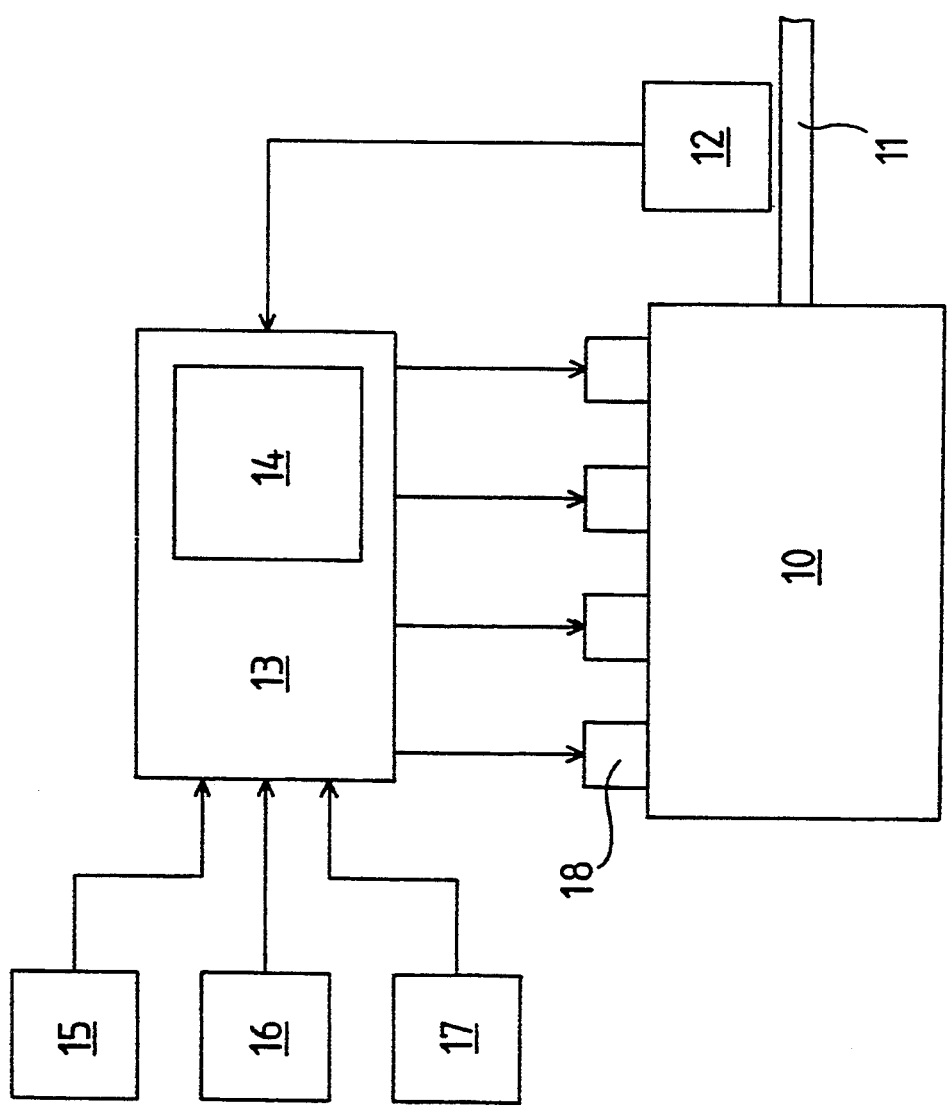
FIG. 3 shows a device for the performance of the method in accordance with the invention.

FIG. 3 shows a device for the performance of the method in accordance with the invention. The number 10 denotes an internal combustion engine, which is in particular a diesel engine. A rotation speed sensor 12 is assigned to a crankshaft 11 of the internal combustion engine 10, which sensor in suitable fashion (for example optically or inductively) measures the rotations of the crankshaft 11, which are the repetitive process. This measured and repetitive process, which is the pulse train shown in FIG. 1 above, is supplied to an electronic control unit 13, which in turn contains a computing unit 14 in which at lease one quantity dependent on the repetitive process is determined in dependence on each pulse emitted, said quantity being in particular a beginning of injection and/or a duration of injection. Furthermore, it is shown in FIG. 3 that assigned to the electronic control unit 13 are a sensor 15 for an oil pressure, a sensor 16 for a coolant temperature, as well as a sensor 17 for a gas pedal position. These measured quantities are supplied to the computing unit 14, in dependence on which the computing unit 14, during the calculation duration B, calculates the beginning of injection and the duration of injection. These quantities calculated in such fashion (for example, the signal E shown in the lowermost pulse train in FIG. 1) are supplied to solenoid-actuated valves 18, which control the delivery of fuel to be injected for the internal combustion engine 10. In FIG. 3 it is shown, by way of example, that a total of four solenoid-actuated valves 18 are assigned to the internal combustion engine 10, which solenoid-actuated valves control the injection of fuel into the individual cylinder of the internal combustion engine 10. This takes place, in particular, by means of the fact that the fuel is pressurized by means of suitable pumps (for example, series pumps, distribution pumps as well as individual pump elements), and the pressurized fuel is delivered to the individual cylinders of the internal combustion engine 10 by means of triggering of the solenoid-actuated valves 18.

The embodiments of the invention in which an exclusive property or privilege is claimed are defined as follows:

1. An improved fuel timing and fuel quantity control apparatus for controlling start timing and quantity of fuel injection to each cylinder of an internal combustion engine, said apparatus comprising:
    an engine having:
        a crankshaft;
        a crankshaft rotational speed sensor affixed in proximity of said crankshaft;
        a plurality of cylinders; and
        a reciprocating piston in each of said cylinders;
    a fuel injection system for said engine including:
        a fuel injector at each cylinder operable to inject fuel thereinto;
        an electrically controlled fuel valve for each of said fuel injectors;

an electronic fuel control unit individually connected to each of said fuel valves;

a rotational speed sensor affixed in proximity to a rotary driven part of said engine and connected in electric signal transmitting relation to said control unit, said speed sensor producing a repetitive electric pulse for each cylinder, said pulses being transmitted to said control unit in a pulse train;

said control unit upon receipt of the leading flank of each pulse being operative to commence calculation of the timing and quantity of fuel injection for the associated cylinder;

a piston position sensor at each cylinder in electric signal transmitting relation to said control unit, each said position sensor generating an instantaneous electric signal upon the associated piston being in a predetermined and reciprocated position;

means transmitting an electric signal to said control unit indicative of the power being demanded of said engine;

said electronic fuel control unit receiving said instantaneous signals indicative of said predetermined position of each piston and said power demand signal and being programmed to perform calculations based thereon to provide optimal injection timing and quantity signals to each of said fuel valves.

* * * * *